(12) United States Patent
Jackson et al.

(10) Patent No.: US 8,061,113 B1
(45) Date of Patent: Nov. 22, 2011

(54) ENHANCED BELT ENGAGEMENT SYSTEM FOR POWER EQUIPMENT

(76) Inventors: Gordon W Jackson, Clayton, NC (US); William R. Best, Benson, NC (US); Harold E. Mills, Raleigh, NC (US)

( * ) Notice: Subject to any disclaimer, the term of this patent is extended or adjusted under 35 U.S.C. 154(b) by 0 days.

(21) Appl. No.: 12/783,606

(22) Filed: May 20, 2010

(51) Int. Cl.
*A01D 69/10* (2006.01)
*A01D 69/00* (2006.01)

(52) U.S. Cl. .......................... 56/11.3; 56/10.8

(58) Field of Classification Search .................. 56/11.3, 56/11.6, 13.5, 13.6, 6, 138, 10.8–11.2, 11.7, 56/11.8; 474/237, 238, 265, 84–89; 74/478, 74/529; 180/19.3, 331, 323
See application file for complete search history.

(56) References Cited

U.S. PATENT DOCUMENTS

| | | | | | |
|---|---|---|---|---|---|
| 3,791,293 | A | * | 2/1974 | Rastorguyeff et al. | 101/234 |
| 3,800,612 | A | * | 4/1974 | Fulghum | 474/135 |
| 4,159,613 | A | * | 7/1979 | Knudson et al. | 56/11.3 |
| 4,721,494 | A | * | 1/1988 | Hayashi et al. | 474/88 |
| 5,367,863 | A | * | 11/1994 | Quataert | 56/13.5 |
| 5,755,548 | A | * | 5/1998 | Gaasch et al. | 414/415 |

* cited by examiner

*Primary Examiner* — Robert Pezzuto
(74) *Attorney, Agent, or Firm* — Jim Passe; Bryan Shang; Passe Intellectual Property, LLC

(57) ABSTRACT

A gradual engagement system for use in power equipment is herein described. The gradual engagement system causes a clutch pulley to rotate around a clutch arm when an engagement tensile force is applied by an engagement spring. The engagement spring is attached to a pivot arm which is also connected to the clutch arm. The gradual engagement system allows the clutch arm to be pressed against a drive belt in a gradual fashion, providing for a smooth engagement of the various components of the power equipment.

18 Claims, 13 Drawing Sheets

ENHANCED BELT ENGAGEMENT SYSTEM FOR POWER EQUIPMENT

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to motorized power equipment and more specifically to motorized power equipment having an enhanced belt engagement system.

2. Description of Related Art

Power equipment such as lawn mowers, snow blowers, and the like typically use a belt or series of belts to power the equipment. A riding lawn mower may have a drive belt connected to the output shaft of a gasoline engine as well as a hydraulic drive system. The hydraulic drive system may in turn drive a propulsion system which moves the mower in either a forward or reverse direction. In addition, the drive belt may also be attached to a pulley or several pulleys which in turn are attached to mower blades. When the drive belt is engaged with the pulley or pulleys, the engine may rotate the mower blades.

A snow blower may also have a similar arrangement with a gasoline powered engine driving a hydraulic drive system. The hydraulic drive system may also be coupled with the wheels of the snow blower and may provide power to the wheels. Similar to the riding lawn mower, the snow blower may have a separate belt system that when engaged, turns the snow blower blades which directs the snow out an exit port.

Depending on the number of pulleys or the inertia of the blades attached to the pulleys, engaging the drive belt when the engine is running may prove to be difficult. In prior art engagement systems, a direct connection system may be used. The direct connection system may have a rod or other type of stiff arm attached to a clutch pulley. When the clutch pulley is disengaged, the rod pushes the clutch pulley away from the drive belt. When the blades are engaged, the rod pulls the clutch pulley a set distance against the drive belt.

One drawback to the prior art direct engagement systems is the lack of a gradual engagement process. Some of the prior art direct engagement systems slam into the drive belt with tremendous force when activated. If the engine is turning at a high rate of speed, the belt could slip, stretch permanently or potentially break when the clutch pulley is slammed into the drive belt. In addition, if the belt stretches over time, the prior art engagement systems may not be easily adjusted to keep the clutch pulley engaged with the appropriate amount of tension.

The present invention overcomes some of the difficulties of the previous direct engagement systems by providing a gradual engagement process that allows the clutch pulley to be moved into position gradually. The use of springs also compensates for varying deck cutting heights where when the deck height changes, the belt essentially changes lengths.

SUMMARY OF THE INVENTION

The present disclosure recognizes these needs and discloses such a gradual engagement system. The gradual engagement system has a clutch pulley which is attached to a clutch arm. The clutch pulley is also attached to a pivot arm. The pivot arm is coupled to a disengaging spring where the disengaging spring applies a disengaging tensile force to the pivot arm in a disengaging direction. The gradual engagement system also has an engaging spring. The engaging spring applies an engaging tensile force to the pivot arm in an engaging direction when stretched. The clutch pulley rotates around the clutch arm and is moveable from a first position to a second position when an engaging tensile force is applied by the engagement spring to the pivot arm causing the pivot arm to extend which in turn causes the clutch pulley to rotate from the first position to the second position. The engaging tensile force is greater than the disengaging tensile force when the clutch pulley moves from the first position to the second position and the disengaging tensile force is greater than the engaging tensile force when the clutch pulley moves from the second position to the first position.

A gradual engagement system for use in power equipment is disclosed. The gradual engagement system has a clutch pulley which is attached to a clutch arm. The clutch pulley is also attached to a pivot arm which is attached to an engaging spring. The engaging spring applies an engaging tensile force to the pivot arm in an engaging direction when stretched. The clutch pulley rotates around the clutch arm and is moveable from a first position to a second position when the engaging tensile force is applied by the engagement spring to the pivot arm which causes the pivot arm to extend. This causes the clutch pulley to rotate from the first position to the second position. The stiffness of the engaging spring causes a disengaging force to be applied to the pivot arm when the clutch pulley moves from the second position to the first position.

DETAILED DESCRIPTION OF THE INVENTION

Figure 1:
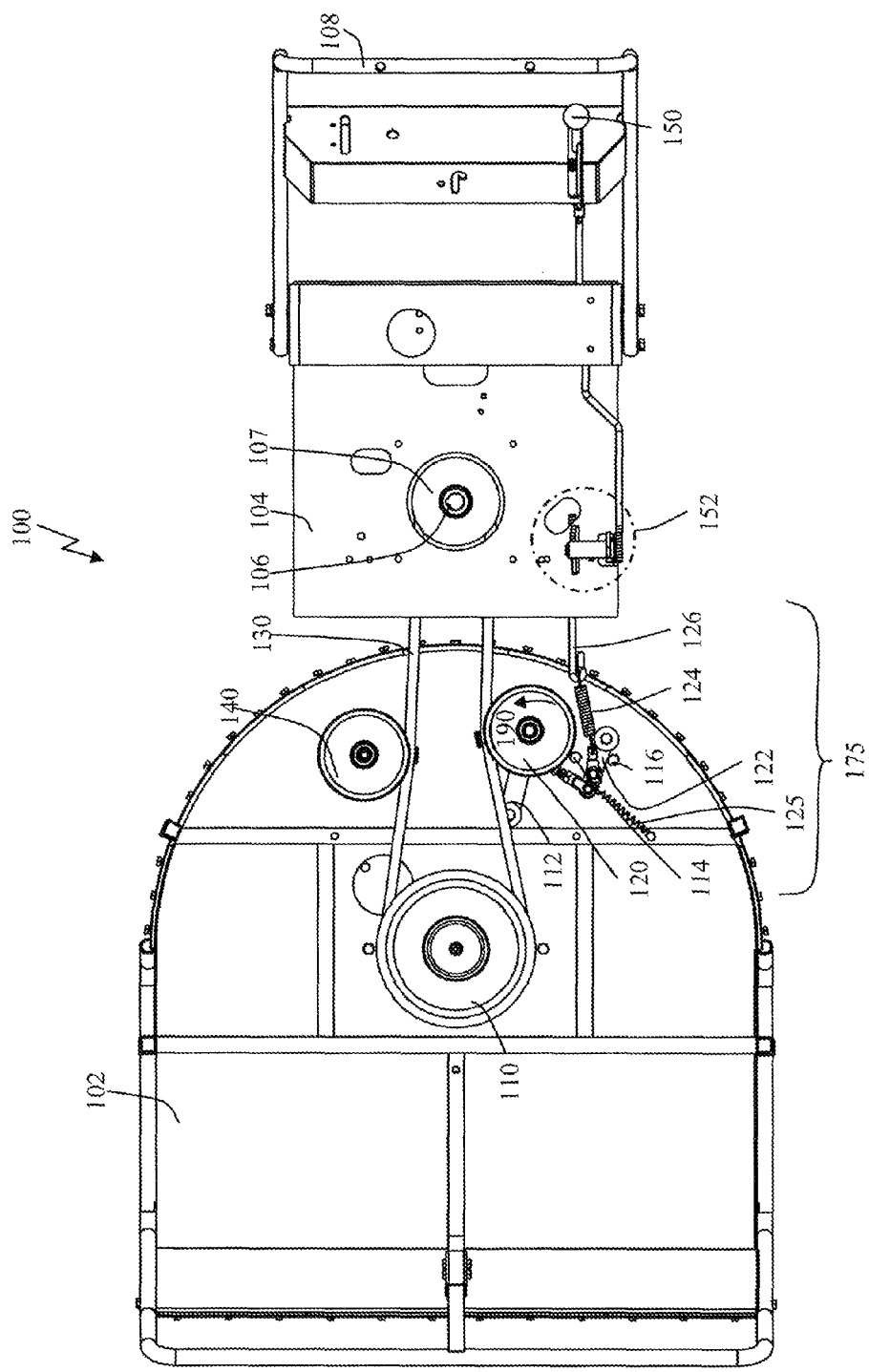
FIG. 1 displays a top view of a single spindle lawn mower having a gradual engagement system in accordance with one embodiment of the present invention with the engagement system in a disengaged position.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

FIG. 1 displays a top view of a single spindle mower 100 having a gradual engagement system 175 in accordance with one embodiment of the present invention. The mower 100 has a mower deck 102 and a frame 104. Underneath the deck 102 are two break away mower blades (not shown for ease of illustration) which are attached to a single spindle which is attached to a blade pulley 110. Routed around the blade pulley 110 is a drive belt 130. Coupled with the drive belt 130 is an idler pulley 140 and a clutch pulley 120. As is shown in FIG. 1, the clutch pulley 120 is in a disengaged position.

On top of the frame 104 is an engine (also not shown for ease of illustration) which has a drive shaft 106. Attached to the drive shaft 106 is a drive pulley 107 on which the drive belt 130 is attached. When the gradual engagement system 175 is partially engaged (FIG. 2) or fully engaged (FIG. 3) and the engine is turning, the drive pulley 107 is rotating, causing the blade pulley 110 to rotate which in turn rotates the blades.

Also attached to frame 104 is a handle bar 108 and an engagement lever 150. The engagement lever 150 is used to engage/disengage the mower blades. If the mower 100 is a push mower, the user walks behind the mower 100 and pushes it by pushing the handle bar 108. In an alternative embodiment, the mower 100 may be a self propelled mower. In this instance, the user may use the handle bar 108 to guide the mower 100 instead of pushing it.

As can be seen in FIG. 1, the engagement lever 150 is in a disengaged position. When in this position, the clutch pulley 120 is not pressed tightly against the drive belt 130. If the motor is turning, the drive pulley 107 may be rotating, but there is not enough pressure being applied to the drive belt 130 to cause the blade pulley 110 to rotate.

The engagement lever 150 is coupled to a connecting mechanism 152, coupled to engagement rod 126 which is coupled to engagement spring 124. The connecting mechanism may consist of various arms and pivot points. For purposes of illustration, the connecting mechanism 152 may be any mechanism that directs movement from the engagement lever 150 to the engagement spring 124.

The engagement spring 124 is in turn coupled to pivot arm 122. The pivot arm 122 is coupled to clutch pulley 120. The clutch pulley 120 is also coupled to clutch arm 112. Also shown in FIG. 1 is a disengaging spring 125 which is coupled to the pivot arm 122. Keeping the pivot arm 122 from traveling too far in the disengaged position is stop bolt 116. Keeping the clutch arm from traveling too far in the engaged position is stop bolt 114 (see FIG. 4 for close up view).

Figure 2:
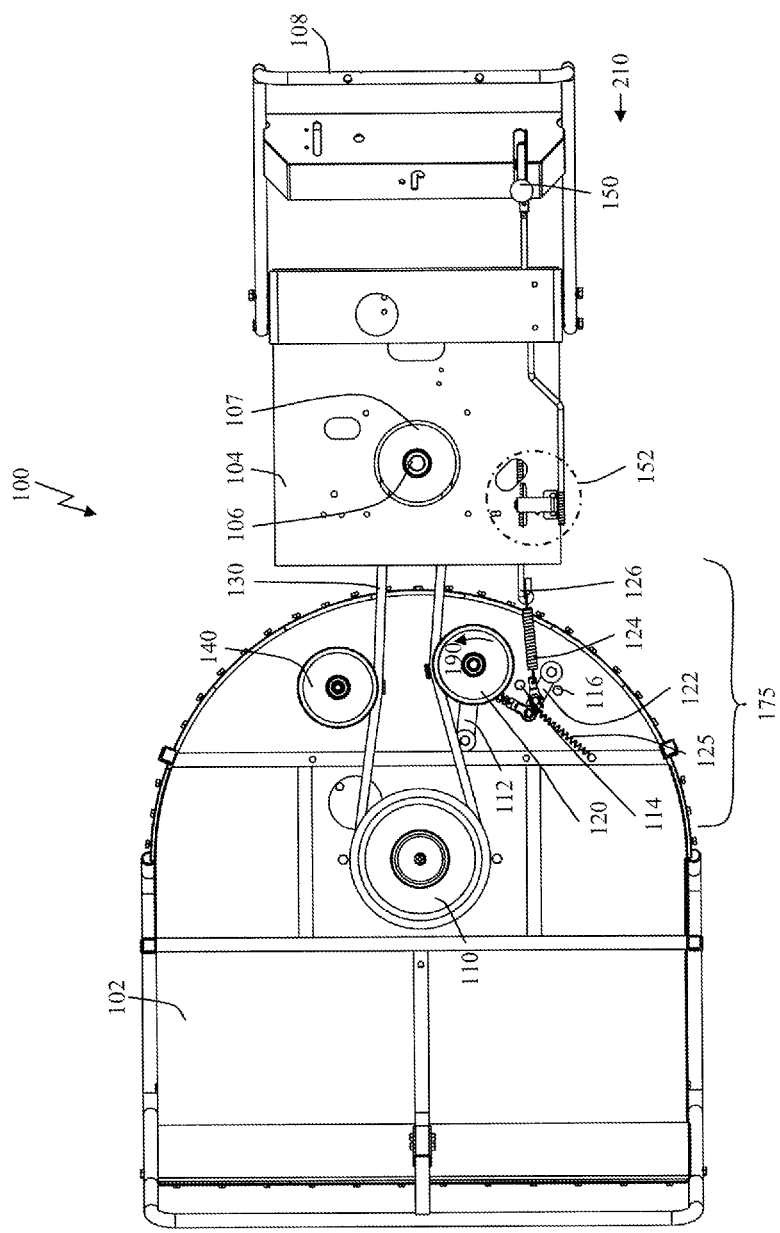
FIG. 2 displays the single spindle lawn mower of FIG. 1 with the gradual engagement system in an intermediate position.

FIG. 2 displays the mower 100 with the engagement lever 150 in an intermediate position. As can be seen in FIG. 2, the engagement lever 150 has moved in a forward direction 210, thus causing the engagement rod 126 to pull on the engaging spring 124. The tension applied by the engaging spring 124 causes the pivot arm 122 to rotate in a clockwise direction which in turn causes the clutch pulley 120 to rotate towards the drive belt 130.

Therefore, when the engagement lever 150 is in the intermediate position (or partially engaged), the clutch pulley 120 will start to apply pressure on the drive belt 130. If the engine is running and sufficient pressure starts to be applied to the drive belt 130, the blade pulley 110 will begin to rotate slowly. As the blade pulley 110 begins its slow rotation, it will accelerate toward operating speed without moving the engagement lever 150. After the blade pulley 110 has reached, or is close to reaching operating speed, the engagement lever 150 can be moved through the remainder of its travel.

Figure 3:
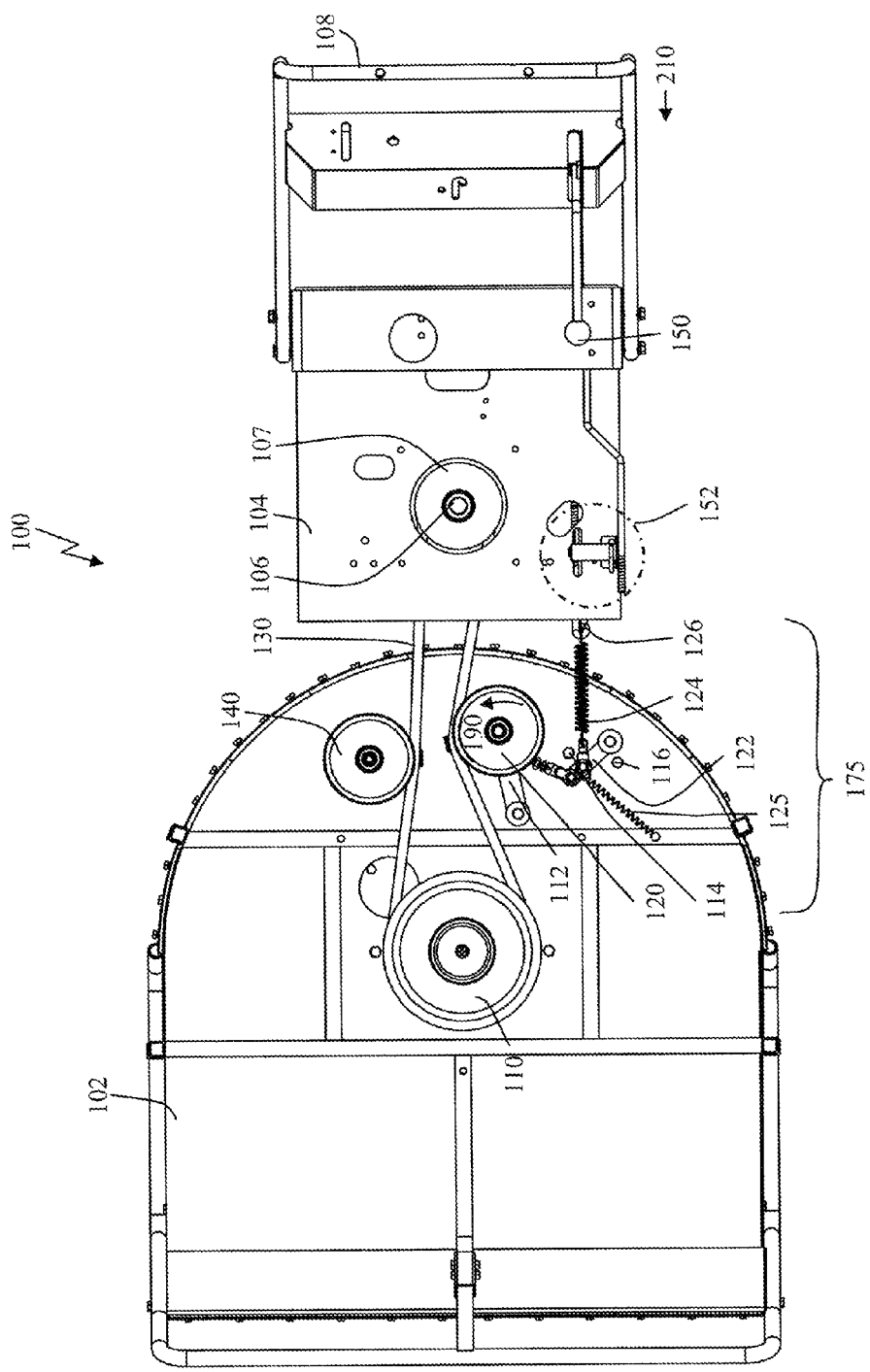
FIG. 3 displays the single spindle lawn mower of FIG. 1 with the gradual engagement system in a fully engaged position.

FIG. 3 displays the mower 100 with the engagement lever 150 in the fully engaged position. In this position, the engagement rod 126 extends the engagement spring 124 to a fully deployed position. In this position, the engagement spring is exerting its maximum tensile force on the pivot arm 122. As can be seen in FIG. 3, the clutch pulley 120 is pressed against the drive belt 130. The continued tensile force being applied by the engagement spring 124 keeps the clutch pulley 120 engaged with the drive belt 130.

One advantage of using the engagement spring 124 to position the clutch into the engaged position is that it allows the engagement spring 124 to apply a gradual force to the clutch pulley 120 as it engages the drive belt 130. As tension begins to increase in the drive belt 130, the blade pulley 110 may start to rotate. Proper selection of the engagement spring 124 will maintain the appropriate tension on the drive belt 130. In some of the prior art engagement systems, too much tension may be applied to the drive belt causing it to be permanently stretched or possibly break.

When the engagement lever 150 is moved from the fully engaged position (FIG. 3) to the disengaged position (FIG. 1), the disengagement spring 125 causes the clutch pulley 120 to pull away from the drive belt 130.

Figure 4:
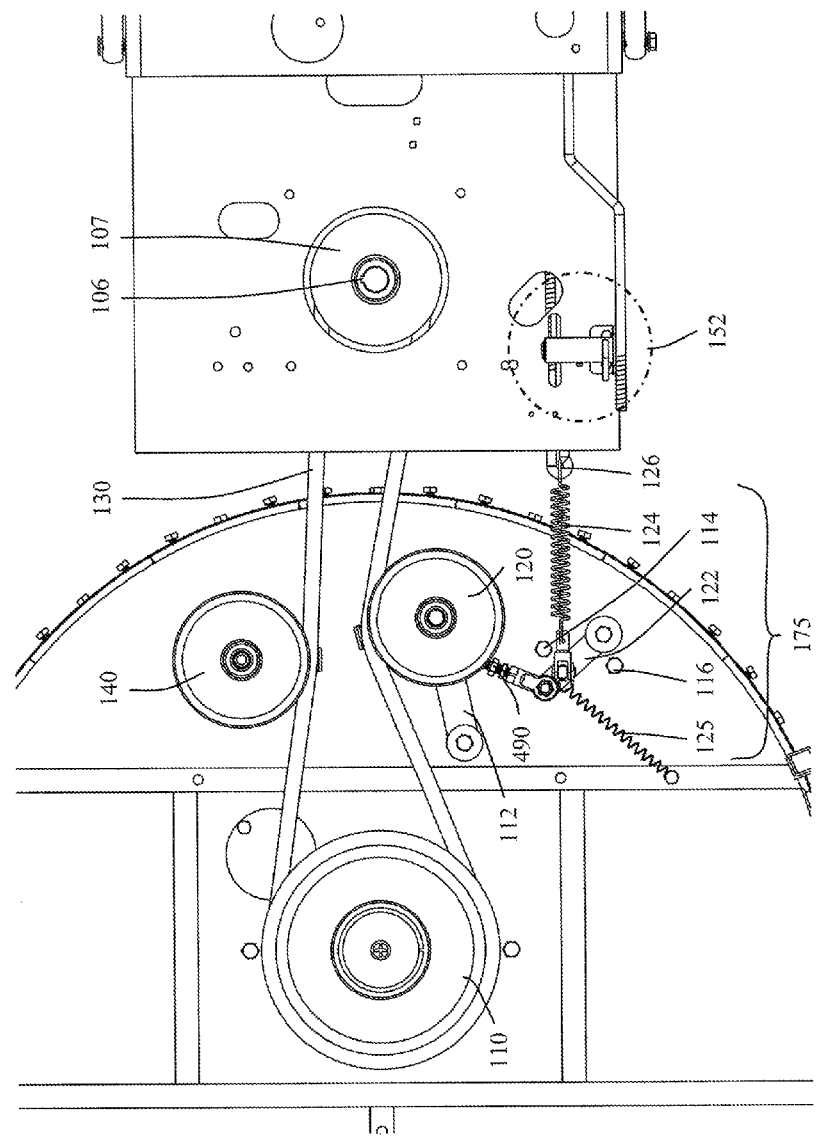
FIG. 4 displays a close up view of the gradual engagement system.

FIG. 4 displays a close up view of the gradual engagement system 175 in the fully engaged position as shown in FIG. 3. As can be seen in FIG. 4, an adjustable clutch mechanism 490 may be positioned on the pivot arm 122. In the embodiment of FIG. 4, the adjustable clutch mechanism may consist of an adjustable turn buckle that increases the distance between the clutch pulley 120 and the pivot arm 122. As the drive belt 130 wears, it may stretch. When the belt stretches, the clutch pulley 120 may need to travel farther against the drive belt 130 in order to exert sufficient pressure. By adjusting the length of the pivot arm 122, the distance the clutch pulley 120 travels may be increased or decreased, depending upon what may be necessary to achieve the appropriate belt tension.

Figure 5:
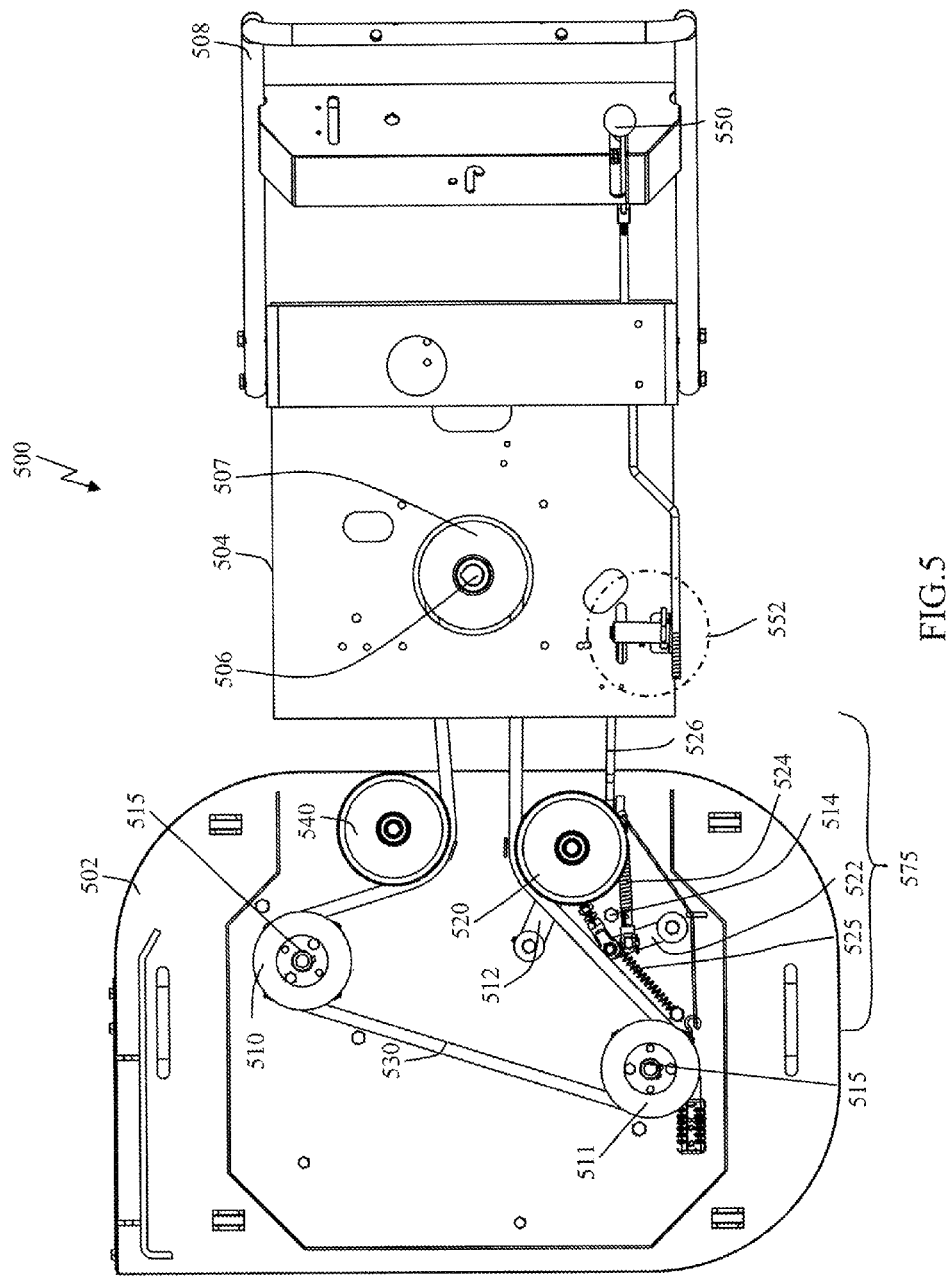
FIG. 5 displays a top view of a dual blade lawn mower having a gradual engagement system in accordance with another embodiment of the present invention with the engagement system in a disengaged position.

FIG. 5 displays a top view of a dual blade mower 500 having a gradual engagement system 575 in accordance with another embodiment of the present invention. The mower 500 has a deck 502 and a frame 504. Underneath the deck 502 are two mower blades (not shown for ease of illustration) that are attached to two mower spindles 515 which are attached to blade pulleys 510 and 511. Routed around the blade pulleys 510 and 511 is a drive belt 530. Coupled with the drive belt 530 is an idler pulley 540 and a clutch pulley 520. As shown in FIG. 5, the clutch pulley 520 is in a disengaged position.

On top of the frame 504 is an engine (also not shown for ease of illustration) which has a drive shaft 506. Attached to the drive shaft 506 is a drive pulley 507 which is connected to the drive belt 530. When the gradual engagement system 575 is partially engaged (FIG. 6) or fully engaged (FIG. 7), and the engine is turning, the drive pulley 507 is rotating, causing the blade pulleys 510 and 511 to rotate which in turn rotates the blades.

Also attached to frame 504 is a handle bar 508 and an engagement lever 550. The engagement lever 550 is used to engage/disengage the mower blades. If the mower 500 is a push mower, the user walks behind the mower 500 and pushes it by pushing the handle bar 508. In yet an alternative embodiment, the mower 500 may be a self propelled mower. In this instance, the user may use the handle bar 508 to guide the mower 500 instead of pushing it.

As mentioned previously, FIG. 5 shows the engagement lever 550 in a disengaged position. When in this position, the clutch pulley 520 is not pressed tightly up against the drive belt 530. If the motor is turning, the drive pulley 507 may be rotating, but there is not enough pressure applied to the drive belt 530 to cause the blade pulleys 510 and 511 to rotate.

Figure 6:
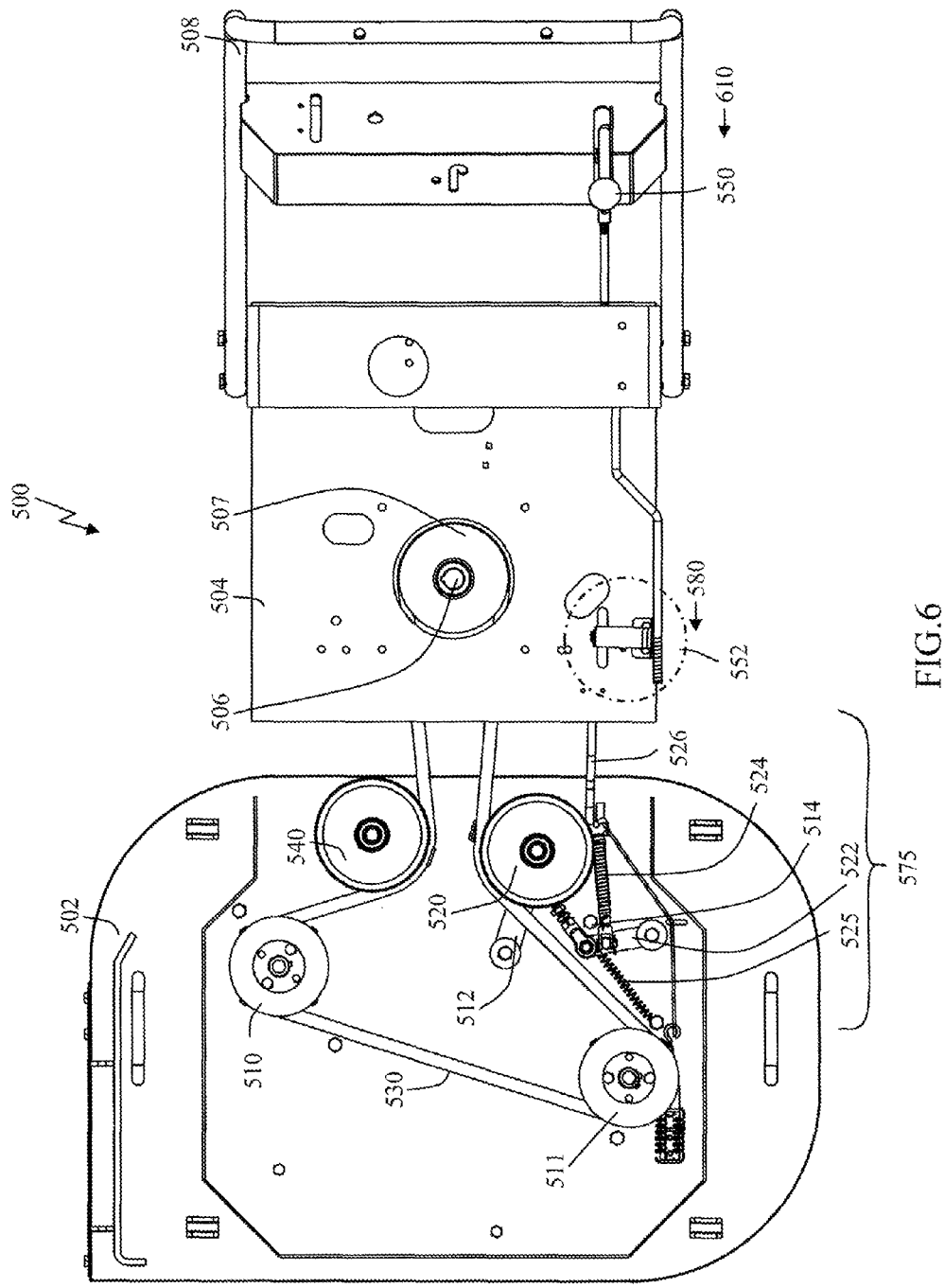
FIG. 6 displays the dual spindle lawn mower of FIG. 5 with the gradual engagement system in an intermediate position.
Figure 7:
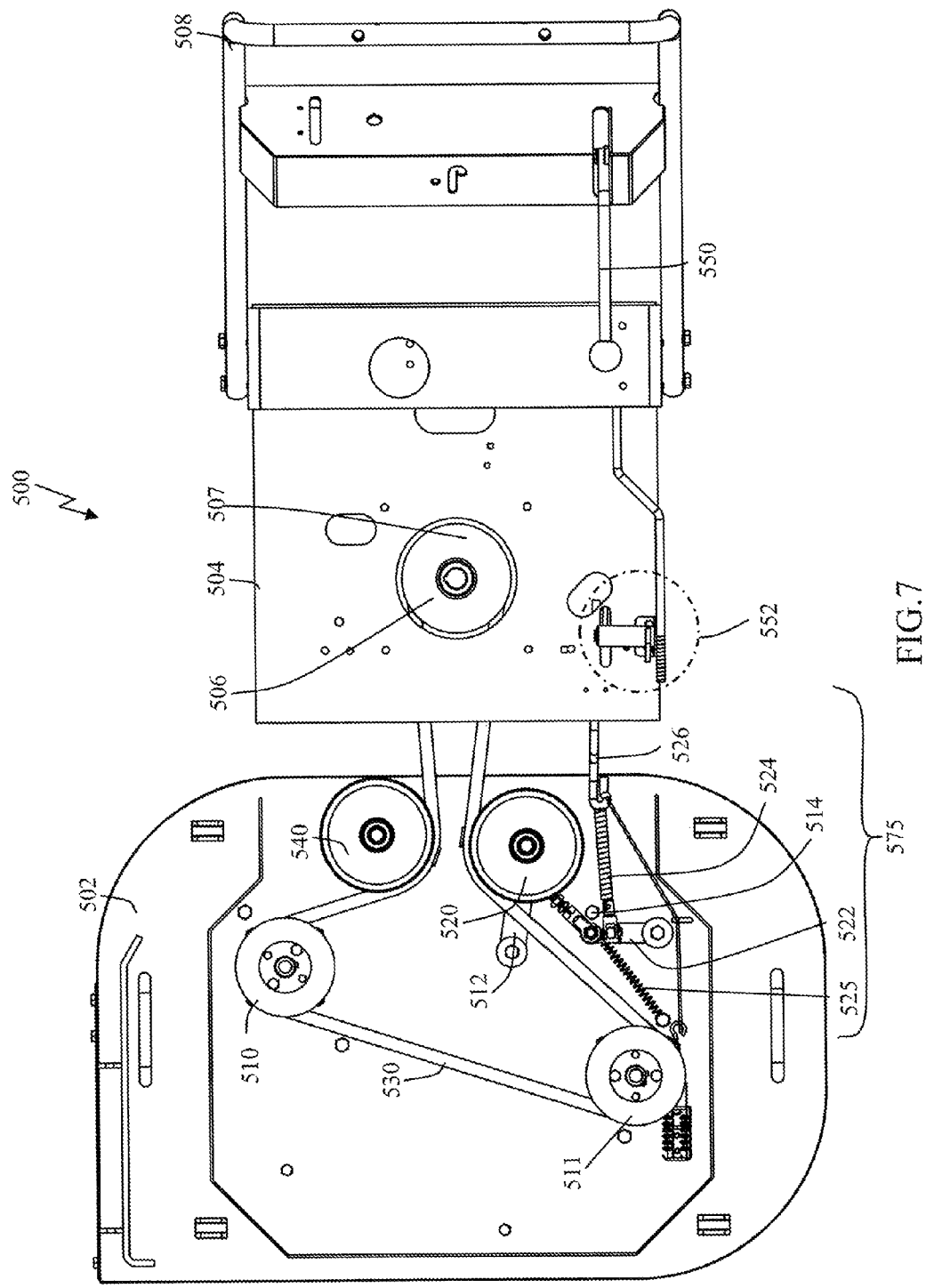
FIG. 7 displays the dual spindle lawn mower of FIG. 5 with the gradual engagement system in a fully engaged position.

The engagement lever 550 through a connecting mechanism 552 is coupled to engagement rod 526 which is coupled to engagement spring 524. The engagement spring 524 is coupled to pivot arm 522. The pivot arm 522 is coupled to clutch pulley 520. The clutch pulley 520 is also coupled to clutch arm 512. Also shown in FIG. 5 is disengaging spring 525 which is coupled to the pivot arm 522. Keeping the pivot arm 522 from traveling too far in the engaged position is stop bolt 514. In the embodiment of FIGS. 5-7, the disengaging spring 525 is linearly positioned with respect to the pivot arm.

This positioning limits the distance the pivot arm 522 can travel when moving from the engaged position to the disengaged position. In the disengaged position, the pivot arm stops when the disengaging spring 525 is in a fully relaxed position.

FIG. 6 displays the mower 500 with the engagement lever 550 in an intermediate position or partially engaged. As can be seen in FIG. 6, the engagement lever 550 has moved in a forward direction 610, thus causing the engagement rod 526 to pull on the engaging spring 524. The tension applied by the engaging spring 524 causes the pivot arm 522 to rotate in a clockwise direction which in turn causes the clutch pulley 520 to rotate towards the drive belt 530.

Therefore, when the engagement lever 550 is in the intermediate position (partially engaged), the clutch pulley 520 will start to apply pressure to the drive belt 530. If the engine is running and sufficient pressure starts to be applied to the drive belt 530, the blade pulleys 510 and 511 may begin to rotate slowly. As the blade pulleys 510 and 511 begin their slow rotation, they will accelerate toward operating speed without moving the engagement lever 550. After the blade pulleys 510 and 511 have reached or are close to reaching operating speed, the engagement lever 550 may be moved through the remainder of its travel.

FIG. 7 displays the mower 500 with the engagement lever 550 in the fully engaged position. In this position, the engagement rod 526 extends the engagement spring 524 to a fully deployed position. In this position, the engagement spring 524 is exerting its maximum tensile force on the clutch arm 522. As can be seen in FIG. 7, the clutch pulley 520 is pressed against the drive belt 530. The continued tensile force being applied by the engagement spring 524 keeps the clutch pulley 520 engaged with the drive belt 530. When the engagement lever 550 is moved from the fully engaged position (FIG. 7) to the disengaged position (FIG. 5), the disengagement spring 525 causes the clutch pulley 520 to pull away from the drive belt 530.

Figure 8:
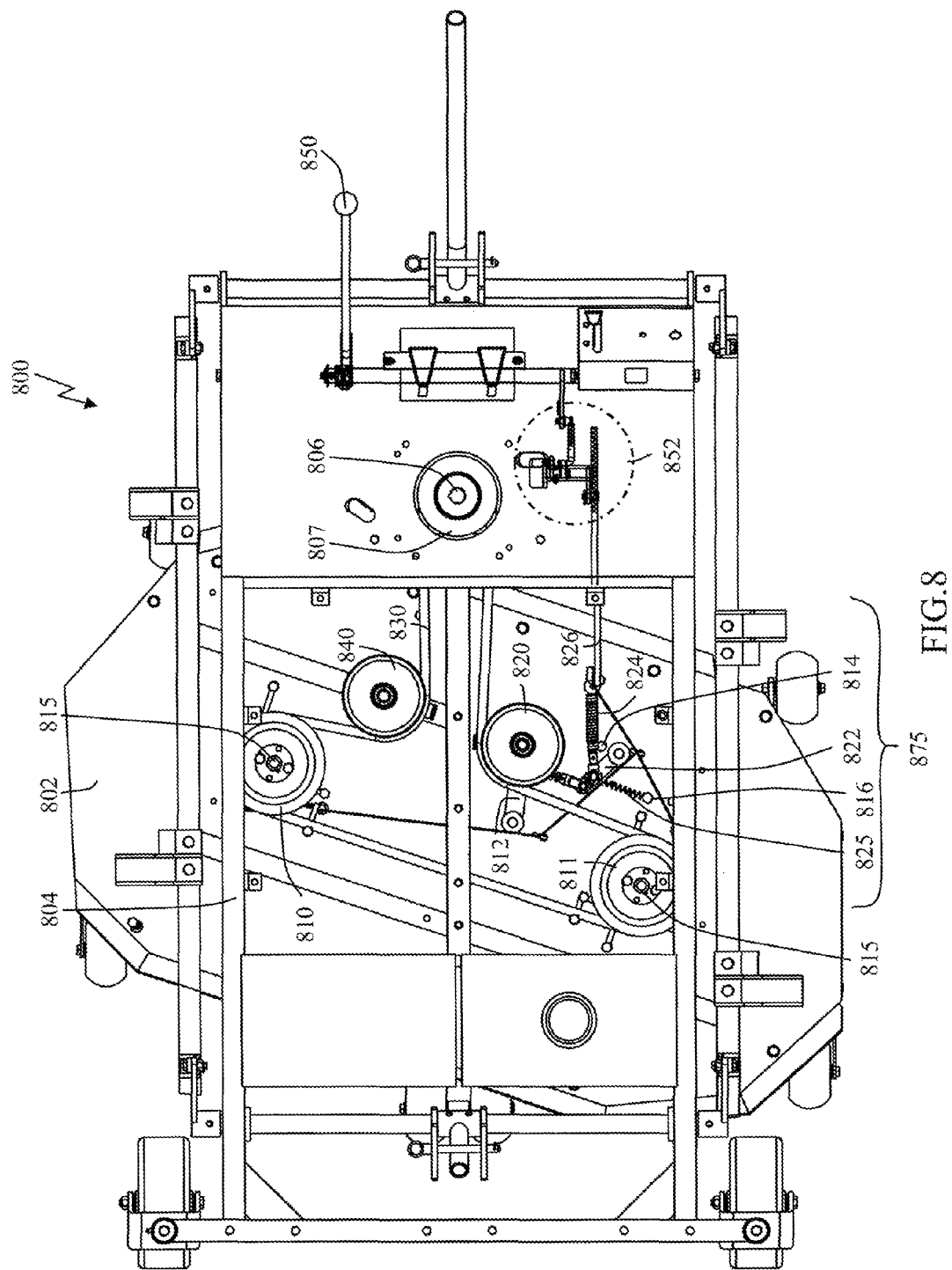
FIG. 8 displays a top view of a tow behind mower having a gradual engagement system in accordance with another embodiment of the present invention with the engagement system in a disengaged position.

FIG. 8 displays a top view of a tow behind mower 800 having a gradual engagement system 875 in accordance with another embodiment of the present invention. The mower 800 has a deck 802 and a frame 804. Underneath the deck 802 are two mower blades (not shown for ease of illustration) which are in turn connected to two spindles 815 which are attached to blade pulleys 810 and 811. Routed around the blade pulleys 810 and 811 is a drive belt 830. Coupled to the drive belt 830 is an idler pulley 840 and a clutch pulley 820. As shown in FIG. 8, the clutch pulley 820 is in a disengaged position.

On top of the frame 804 may be an engine (also not shown for ease of illustration) which has a drive shaft 806. Attached to the drive shaft 806 is a drive pulley 807 which is connected to the drive belt 830. When the gradual engagement system 875 is partially engaged (FIG. 9) or fully engaged (FIG. 10), and the engine is turning, the drive pulley 807 is rotating causing the blade pulleys 810 and 811 to rotate which in turn rotates the blades. Attached on the tow behind mower 800 is an engagement lever 850. The engagement lever 850 is used to engage/disengage the mower blades.

As mentioned previously, FIG. 8 shows the engagement lever 850 in a disengaged position. When in this position, the clutch pulley 820 is not being pressed against the drive belt 830. If the motor is turning, the drive pulley 807 may be rotating, but there is not enough pressure being applied to the drive belt 830 to cause the blade pulleys 810 and 811 to turn.

The engagement lever 850 is coupled through a connecting mechanism 852 to engagement rod 826 which is coupled to engagement spring 824. The engagement spring 824 is coupled to pivot arm 822. The pivot arm 822 is coupled to clutch pulley 820. The clutch pulley 820 is also coupled to clutch arm 812. Also shown in FIG. 8 is disengaging spring 825 which is coupled to the pivot arm 822. Similar to the embodiment shown in FIGS. 5-7, the disengaging spring 825 limits the distance the pivot arm 822 travels when in the disengaged position. Keeping the pivot arm 822 from traveling too far in the engaged position is stop bolt 814.

Figure 9:
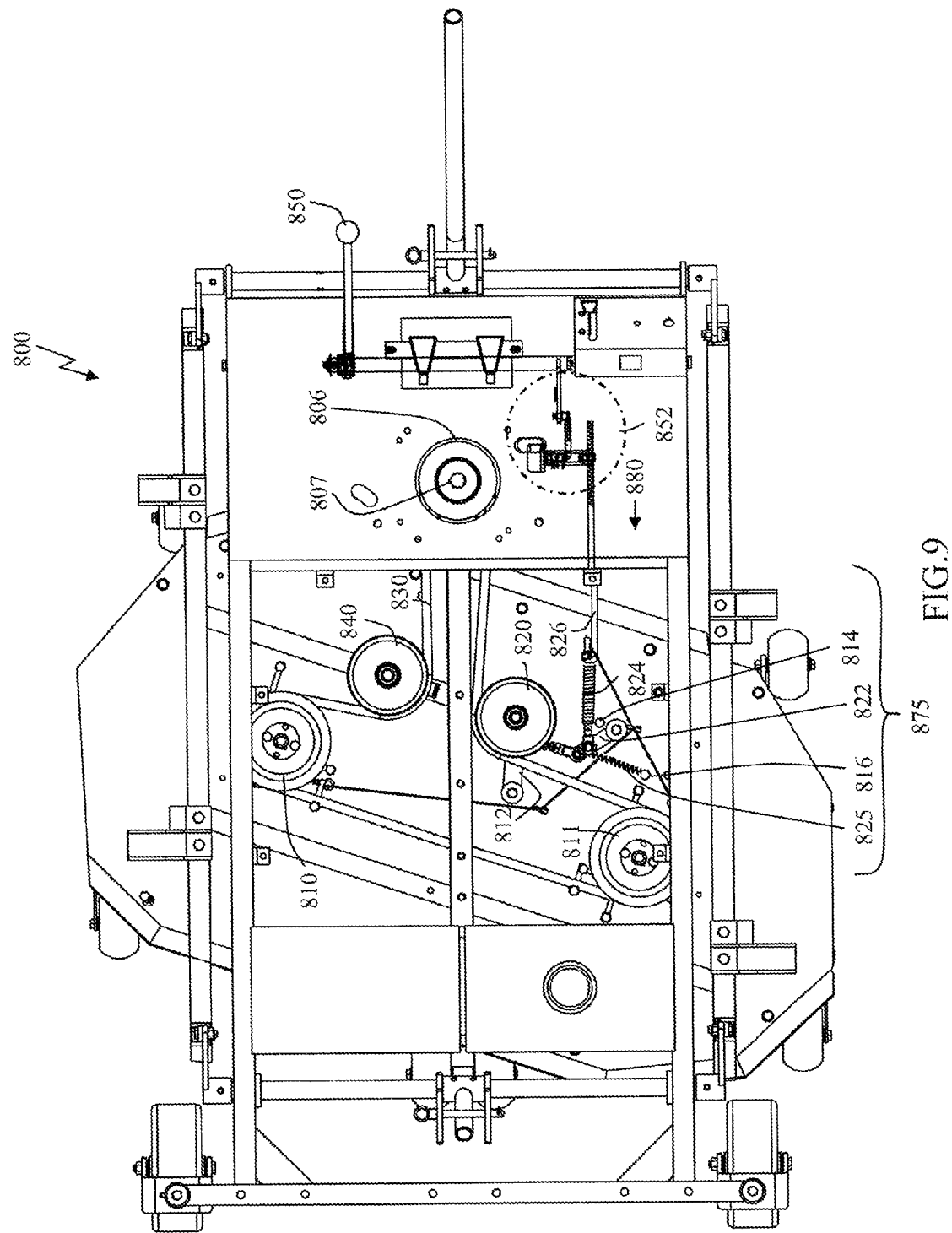
FIG. 9 displays the tow behind lawn mower of FIG. 8 with the gradual engagement system in an intermediate position.

FIG. 9 displays the tow behind mower 800 with the engagement lever 850 in an intermediate position. As can be seen in FIG. 9, the engagement lever 850 has moved in a forward direction, thus causing the engagement rod 826 to pull on the engaging spring 824. The tension applied by the engaging spring 824 causes the pivot arm 822 to rotate in a clockwise direction which in turn causes the clutch pulley 820 to rotate towards the drive belt 830.

Therefore, when the engagement lever 850 is in the intermediate position (partially engaged), the clutch pulley 820 may start to apply light pressure to the drive belt 830. If the engine is running and light pressure is applied to the drive belt 830, the blade pulleys 810 and 811 begin to rotate slowly. As the blade pulleys 810 and 811 begin their slow rotation, they will accelerate toward operating speed without moving the engagement lever 850. After the blade pulleys 810 and 811 have reached or are close to reaching operating speed, the engagement lever 850 may be moved through the remainder of its travel.

Figure 10:
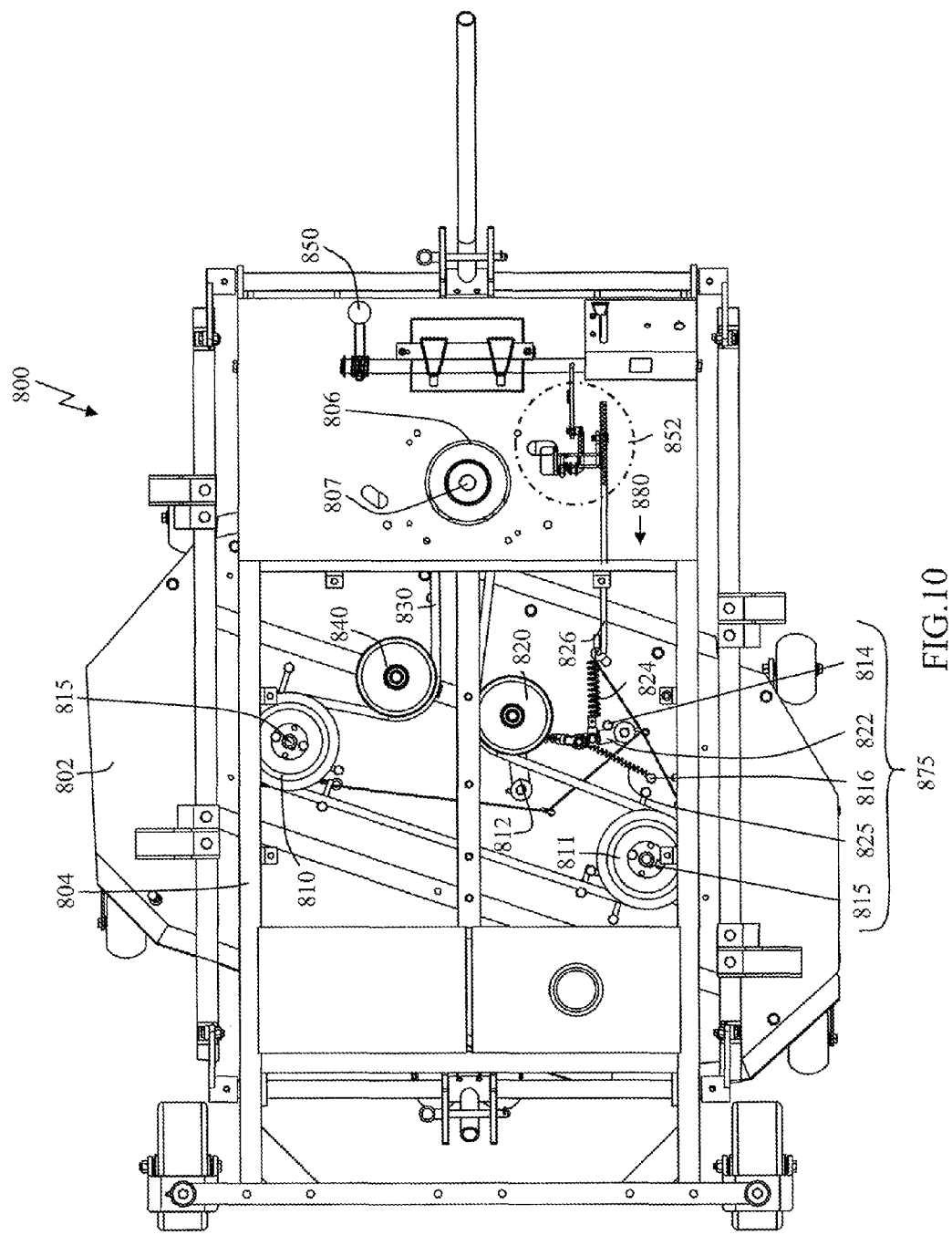
FIG. 10 displays the tow behind lawn mower of FIG. 8 with the gradual engagement system in a fully engaged position.

FIG. 10 displays the mower 800 with the engagement lever 850 in the fully engaged position. In this position, the engagement rod 826 extends the engagement spring 824 to a fully deployed position. In this position, the engagement spring 824 is exerting its maximum tensile force on the pivot arm 822. As can be seen in FIG. 10, the clutch pulley 820 is pressed against the drive belt 830. The continued tensile force being applied by the engagement spring 824 keeps the clutch pulley 820 engaged with the drive belt 830.

When the engagement lever 850 is moved from the fully engaged position (FIG. 10) to the disengaged position (FIG. 8), the disengagement spring 825 causes the clutch pulley 820 to pull away from the drive belt 830. Pulling the clutch pulley 820 away allows the tension to be removed causing less pressure on the drive belt 830.

Figure 11:
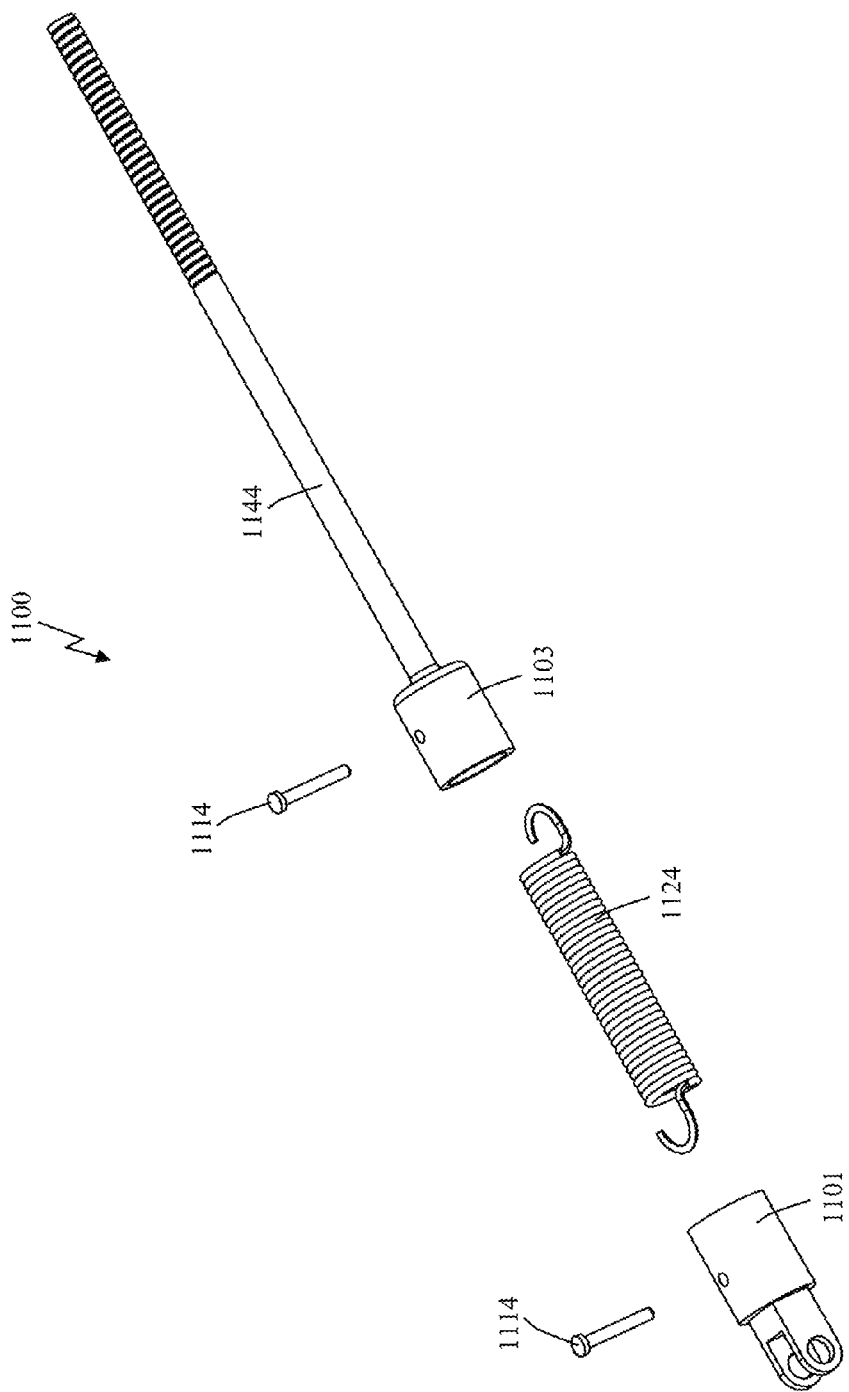
FIG. 11 displays a spring used in a gradual engagement system in accordance with one embodiment of the present invention.

FIG. 11 displays an engagement spring assembly 1100 in accordance with one embodiment of the present invention. The engagement spring assembly 1100 may be substituted in place of engagement spring 124 and disengaging spring 125 (FIG. 1). The engagement spring assembly 1100 has a front cap 1101 and a rear cap 1103 which attach onto the ends of spring 1124. The front cap 1101 and rear cap 1103 are held in place by pins 1114. Attached to the rear cap 1103 is engagement rod 1144.

Figure 12:
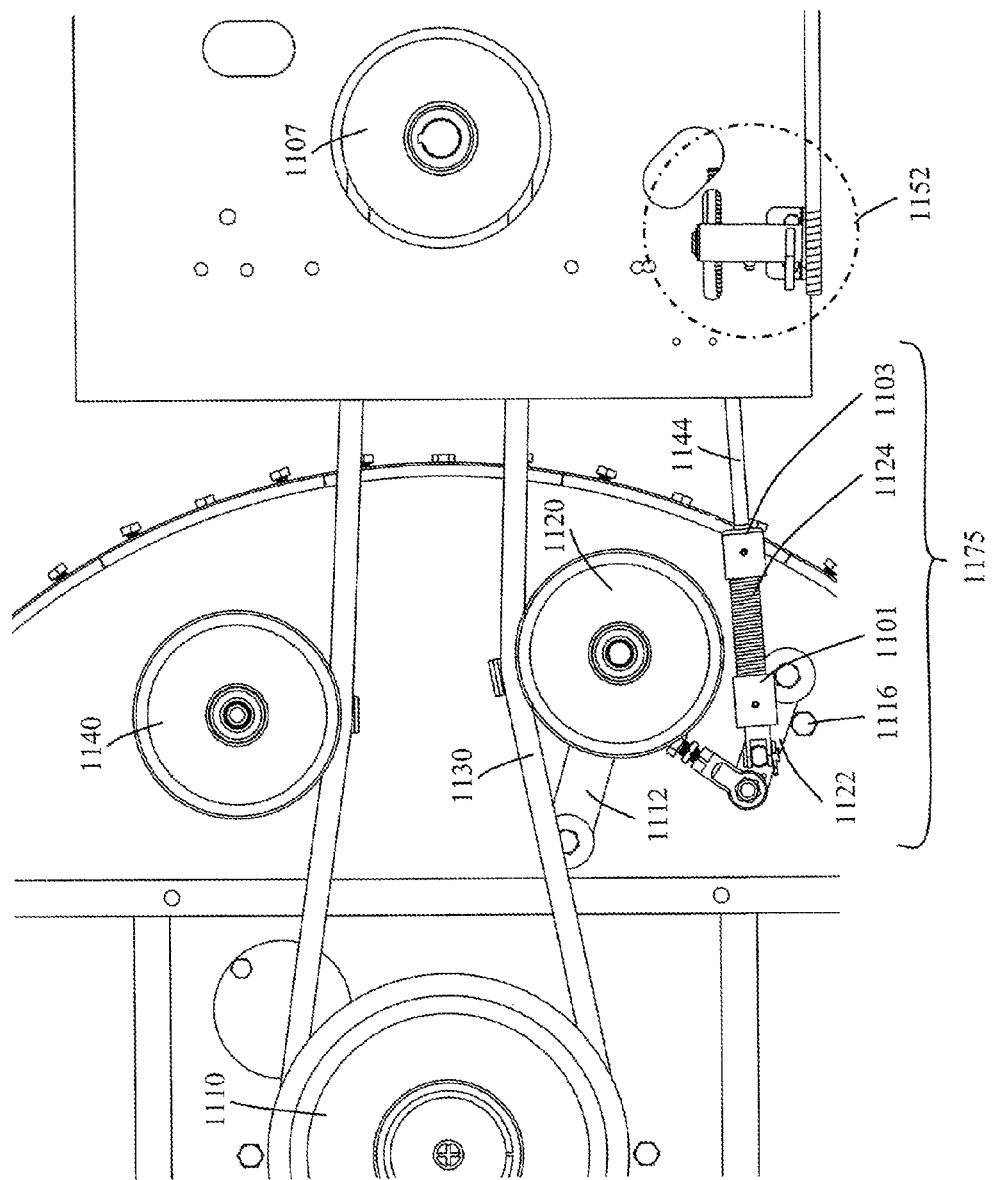
FIG. 12 displays a close up top view of a single spindle lawn mower having a gradual engagement system using the spring of FIG. 11 in accordance with one embodiment of the present invention with the engagement system in a disengaged position.

FIG. 12 displays the engagement spring assembly 1100 installed in a gradual engagement system 1175. As shown in FIG. 12, the gradual engagement system 1175 is in a disengaged position. When in this position, clutch pulley 1120 is not pressed tightly against drive belt 1130. If the motor is turning, drive pulley 1107 may be rotating, but there is not enough pressure being applied to the drive belt 1130 to cause blade pulley 1110 to rotate.

The engagement lever (not shown) is coupled to a connecting mechanism 1152 coupled to engagement rod 1144 which is coupled to engagement spring assembly 1100. The connecting mechanism 1152 may consist of various arms and pivot points. For purposes of illustration, the connecting mechanism 1152 may be any mechanism that directs movement from the engagement lever to the engagement spring assembly 1100.

The engagement spring assembly 1100 is in turn coupled to pivot arm 1122. The pivot arm 1122 is coupled to clutch pulley 1120. The clutch pulley 1120 is also coupled to clutch arm 1112. Keeping the pivot arm 1122 from traveling too far in the disengaged position is stop bolt 1116. Keeping the clutch arm from traveling too far in the engaged position is stop bolt 1114 (See FIG. 13). The engagement spring assembly 1100 may be stiff enough to take the force applied to it by engagement rod 1144 and apply it directly to the pivot arm 1122. The front cap 1101 and rear cap 1103 keep the spring 1124 from flexing in a perpendicular direction away from the linear force being applied by the engagement rod 1144.

Figure 13:
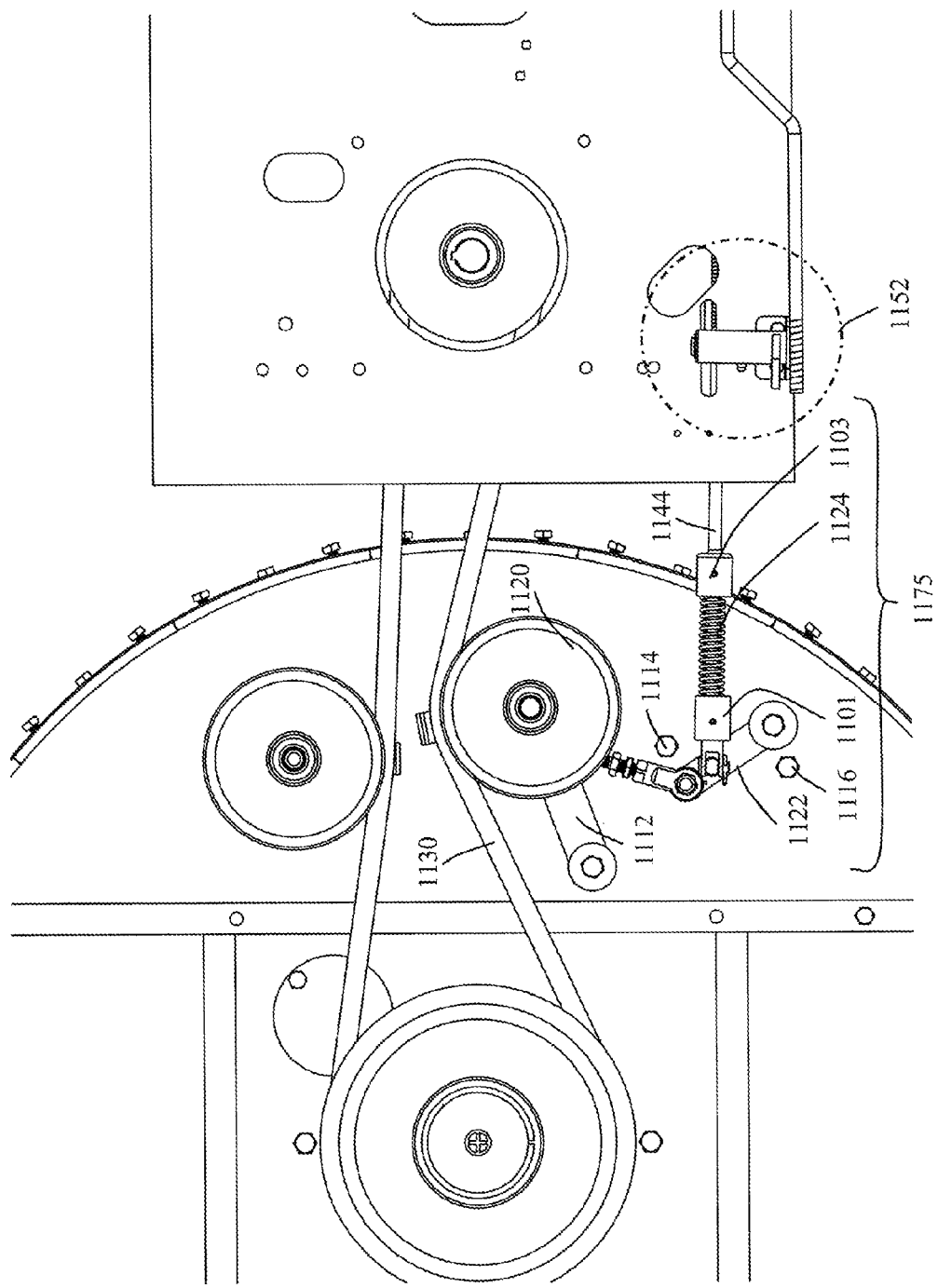
FIG. 13 displays the single spindle lawn mower of FIG. 12 with the gradual engagement system in a fully engaged position.

FIG. 13 displays the gradual engagement system 1175 in the fully engaged position. In this position, the engagement rod 1144 extends the engagement spring 1124 to a fully deployed position. In this position, the engagement spring assembly 1100 is exerting its maximum tensile force on the pivot arm 1122. As can be seen in FIG. 13, the clutch pulley 1120 is pressed against the drive belt 1130. The continued tensile force being applied by the engagement spring assembly 1100 keeps the clutch pulley 1120 engaged with the drive belt 1130.

Although specific embodiments have been illustrated and described herein, those of ordinary skill in the art appreciate that any arrangement, which is calculated to achieve the same purpose, may be substituted for the specific embodiments shown and that the invention has other applications in other environments. For example, the inventive concepts of the present invention may also be applied to various other types of power equipment, including, but not limited to, snow blowers, go-karts and the like, all utilizing belts to drive the various components. This application is intended to cover any adaptations or variations of the present invention. The following claims are in no way intended to limit the scope of the invention to the specific embodiments described herein.

What is claimed is:

1. A gradual engagement system for use in power equipment, the gradual engagement system comprising:
   a clutch pulley attached to;
   a clutch arm, the clutch pulley also attached to;
   a pivot arm, the pivot arm also coupled to;
   a disengaging spring, the disengaging spring applying a disengaging tensile force to the pivot arm in a disengaging direction, and;
   an engaging spring, the engaging spring applying an engaging tensile force to the pivot arm in an engaging direction when stretched;
   wherein the clutch pulley rotates around the clutch arm, moveable from a first position to a second position when an engaging tensile force is applied by the engagement spring to the pivot arm causing the pivot arm to extend causing the clutch pulley to rotate from the first position to the second position;
   wherein the engaging tensile force is greater than the disengaging tensile force when the clutch pulley moves from the first position to the second position, and the disengaging tensile force is greater than the engaging tensile force when the clutch pulley moves from the second position to the first position.

2. The gradual engagement system of claim 1 wherein the clutch pulley moveable to an intermediate position, the intermediate position between the first position and the second position.

3. The gradual engagement system of claim 1 usable in a lawn mower.

4. The gradual engagement system of claim 3 wherein the lawn mower is power driven push mower.

5. The gradual engagement system of claim 3 usable in a tow behind mower.

6. The gradual engagement system of claim 3 wherein the lawn mower further comprises a single mower blade pulley.

7. The gradual engagement system of claim 3 wherein the lawn mower further comprises a plurality of mower blade pulleys.

8. The gradual engagement system of claim 1 usable in a snow blower.

9. The gradual engagement system of claim 1 further comprising an adjustable clutch mechanism.

10. A gradual engagement system for use in power equipment, the gradual engagement system comprising:
   a clutch pulley attached to;
   a clutch arm, the clutch pulley also attached to;
   a pivot arm, the pivot arm also coupled to;
   an engaging spring, and;
   a disengaging spring,
the engaging spring applying an engaging tensile force to the pivot arm in an engaging direction when stretched;
   wherein the clutch pulley rotates around the clutch arm, moveable from a first position to a second position when the engaging tensile force is applied by the engagement spring to the pivot arm causing the pivot arm to extend, causing the clutch pulley to move from the first position to the second position;
   wherein the disengaging spring causes a disengaging force to be applied to the pivot arm causing the clutch pulley to move from the second position to the first position.

11. The gradual engagement system of claim 10 wherein the clutch pulley moveable to an intermediate position, the intermediate position between the first position and the second position.

12. The gradual engagement system of claim 10 usable in a lawn mower.

13. The gradual engagement system of claim 12 wherein the lawn mower is power driven push mower.

14. The gradual engagement system of claim 12 usable in a tow behind mower.

15. The gradual engagement system of claim 12 wherein the lawn mower further comprises a single mower blade pulley.

16. The gradual engagement system of claim 12 wherein the lawn mower further comprises a dual mower blade pulley.

17. The gradual engagement system of claim 10 usable in a snow blower.

18. The gradual engagement system of claim 10 further comprising an adjustable clutch mechanism.

* * * * *